Patented Nov. 25, 1952

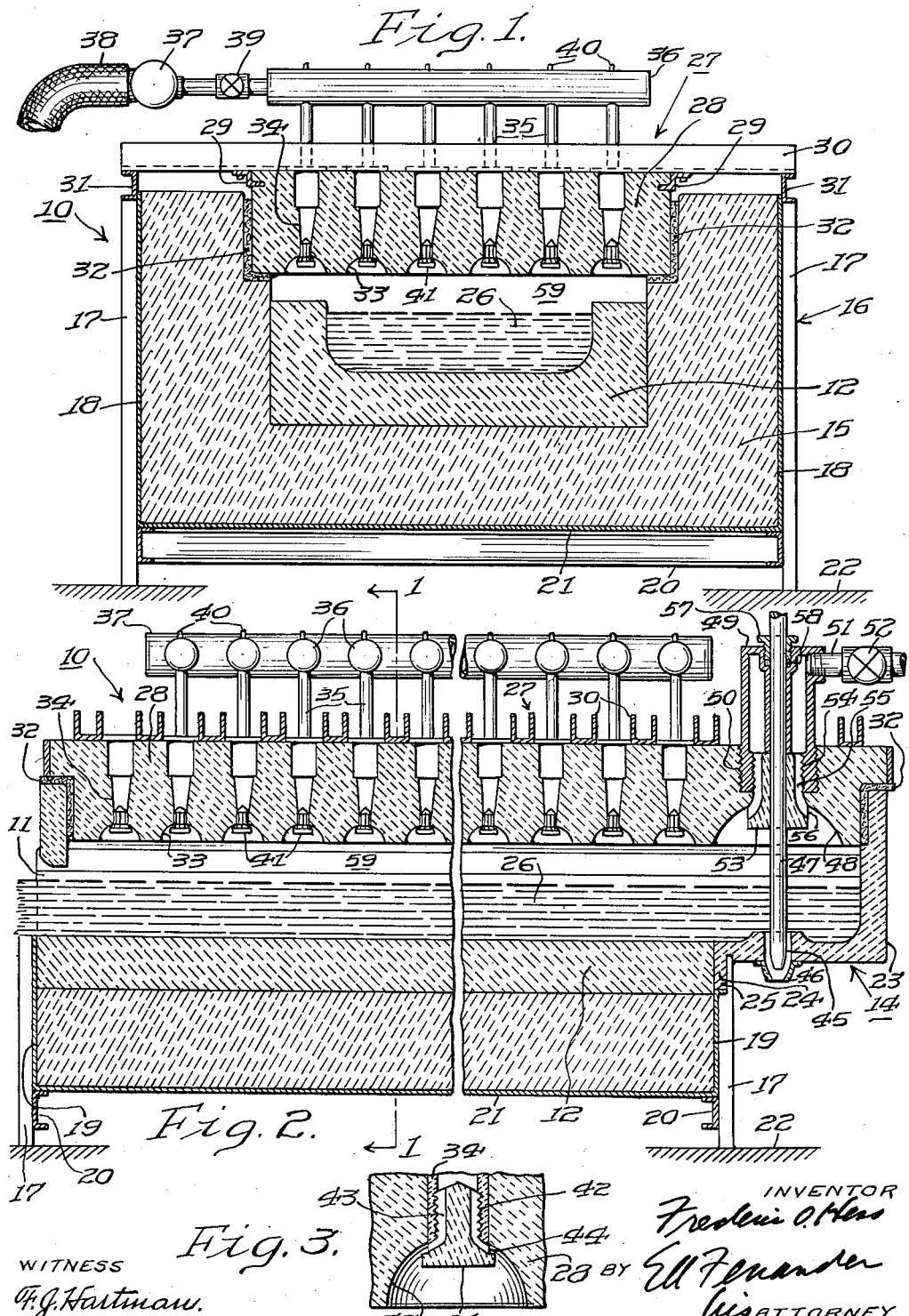
Nov. 25, 1952 — F. O. HESS — 2,618,906
GLASS MELTING FURNACE
Filed Sept. 14, 1945

2,618,906

UNITED STATES PATENT OFFICE 2,618,906

GLASS MELTING FURNACE

Frederic O. Hess, Philadelphia, Pa., assignor to Selas Corporation of America, Philadelphia, Pa., a corporation of Pennsylvania Application September 14, 1945, Serial No. 616,225

2 Claims. (Cl. 49—55)

My invention relates to the art of glass melting, and more particularly to improvements for effectively controlling the temperature of molten glass in channels or forehearths.

In apparatus of this type glass is usually melted in a tank and flows therefrom through a channel or forehearth to a gathering pot, delivery bowl or spout. It is especially desirable to control the temperature of the molten glass in the channel or forehearth into which it is introduced from the glass melting tank. Such temperature control is of importance in order to adjust and regulate the viscosity of the molten glass and hence the rate of flow thereof in the channel or forehearth.

In accordance with my invention it is proposed to control the temperature of the molten glass in the channel or forehearth by providing a plurality of heating zones each of which may be heated to a highly radiant condition by effecting substantially complete combustion of a combustible mixture at regions closely adjacent to the heating zones. The combustible fuel mixture is supplied individually to each of the heating zones and independently regulable, so that the high temperature radiant heating effects produced by each heating zone may be precisely controlled. When the heating zones are distributed in the roof of the channel or forehearth so as to direct radiant heat downwardly therefrom, the desired radiant heating pattern may be produced for effectively controlling the temperature of the molten glass in the channel.

Further, the heating zones may be so disposed that high temperature radiant heat is directed therefrom directly onto the top spaced apart edges of the refractory channel member forming a passage for the molten glass in the forehearth. In this way heat is conducted from the top spaced apart edges of the refractory channel member to the bottom thereof to promote the desired heating of the molten glass. Since the supply of the combustible fuel mixture to each heating zone may be independently regulated, the extent to which radiant heat is applied directly to the top edges of the refractory channel member can be readily controlled.

In order to control the viscosity of the molten glass and maintain the glass at the precise desired temperature at the delivery bowl or spout, I provide a radiant heating zone directly above the feed outlet of the delivery bowl which can be heated to a highly radiant condition by combustion of a combustible fuel mixture at a region closely adjacent thereto and to which the supply of combustible fuel is also independently regulable. When the feeding of glass through the outlet is effected with the aid of a refractory plunger, the heating zone provided especially for the delivery bowl or spout may be associated with such plunger to promote feeding of molten glass at the desired elevated temperature.

The novel features which I believe to be characteristic of my invention are set forth with particularity in the claims. The invention itself, however, both as to organization and method, together with the objects and advantages thereof, will be better understood by reference to the following description taken in connection with the accompanying drawing in which:

Fig. 1 is a transverse vertical sectional view, taken at line 1—1 of Fig. 2, diagrammatically illustrating a forehearth or channel embodying the invention;

Fig. 2 is a longitudinal vertical sectional view of the channel or forehearth of Fig. 1; and Fig. 3 is an enlarged fragmentary sectional view of a radiator to illustrate more clearly the character of the heating zones embodied in the forehearth or channel shown in Figs. 1 and 2.

Referring to the drawing, I have shown a channel or forehearth 10 of a glass furnace into which molten glass is introduced at an inlet 11 from a glass melting tank or refining chamber to which the forehearth is connected in a manner well known in the art. The forehearth 10 comprises a refractory channel member 12 which is U-shaped in section and extends from the inlet 11 to a glass delivery bowl or spout 14 at the outlet end of the channel member.

The channel member 12 is held in position within a relatively thick insulating lining or wall 15 which is also U-shaped in transverse section and preferably formed of refractory material of poor thermal conductivity. The channel member 12 and insulating wall 15 are supported and retained in an outer metallic casing 16 including vertical angle members 17 fixed to side walls 18 and end walls 19, and bottom horizontal channel members 20 which support a bottom plate 21 and are secured to the vertical angle members 17 adapted to rest on a suitable supporting surface 22.

The delivery bowl or spout 14 at the outer end of the channel member 12 serves as an extension of the latter and may be supported in any suitable manner at the end of the casing 16. As shown, the delivery bowl wall 23 is formed of refractory material and provided with a downwardly extending lip 24 which is secured, as by high temperature fire-brick cement, for example, to the end of the channel member 12 and extends into recesses 25 formed at the upper ends of the vertical angle members 17.

The forehearth 10 is provided with a removable roof 27 comprising a horizontally disposed refractory wall section 28 made of a plurality of burner blocks. The wall section is secured by angle brackets 29 to a number of spaced apart channel members 30 which extend or project beyond the sides of the wall section 28. When the roof 27 is placed in position over the channel member 12, as shown in Figure 1, the ends of the members 30 rest on channel members 31 fixed to the upper ends of the vertical angle members 17. Hence, the casing 16 supports the weight of the roof 27 and the gap between the refractory wall section 28 and the insulating wall 15 and delivery bowl 14 is filled with a suitable insulating material 32, such as asbestos rope, for example.

In accordance with the invention, the molten glass 26 in the passage formed by the channel member 12 is heated by radiant heat directed downwardly from a plurality of radiators 33 embodied in the refractory wall section 28. As shown most clearly in Fig. 3, the radiators 33 are cup-shaped and of parabolic form and constitute radiant type burners each having a passage extending upwardly therefrom within which is disposed a sleeve or tube 34. The upper ends of the sleeves 34 are connected by conduits 35 to a number of manifolds 36 each connected to a main manifold 37 to which a complete combustible fuel mixture is delivered through a conduit 38 from a suitable source of supply. Suitable valves 39 may be provided to control the pressure and rate at which the combustible fuel mixture is supplied to the manifolds 36, and the supply of the fuel mixture for the radiators 33 may be individually controlled by valves 40 disposed in conduits 35.

Distributor caps 41 are threadedly secured at 42 to the lower ends of the tubes 34 and formed with a number of longitudinal slots or grooves 43 at the peripheries thereof for subdividing the combustible fuel mixture to form a plurality of small gas streams. The gas streams are discharged from the distributor caps 41 at 44, as shown in Fig. 3, at which regions a plurality of relatively small burner flames are produced and maintained. The burner flames project outwardly from the distributor caps 41 at regions closely adjacent to and overlying the surfaces of the parabolic radiators 33 which are heated to a highly radiant condition.

The delivery bowl 14 at the bottom thereof is formed with a feed opening 45 having an orifice ring 46 associated therewith. Suitable mechanism including a refractory plunger 47 may be provided for controlling the feeding of glass through the opening 45. In order to insure feeding of glass at the opening 45 at the desired elevated temperature, a radiator 48 is provided in the roof 27 directly above the feed opening.

The radiator 48 is also cup-shaped and of parabolic form and a central passage extends upwardly therefrom through the roof 27. A ring-shaped hollow sleeve 49 is disposed in the upper enlarged portion of this passage and threadedly secured at its lower end at 50 to the refractory wall section 28. A combustible fuel mixture is delivered from a suitable source of supply to the hollow sleeve 49 through a conduit 51 in which is provided a manually operable control valve 52.

A distributor cap 53, similar to the distributor caps 41, is threadedly secured at 54 to the lower end of the sleeve 49. The upper end of the distributor cap 53 may be ground smooth and suitable cement applied thereto before it is threadedly secured in position, so that a gas tight seal is effected between the cap 53 and the bottom edge of the inner wall of the hollow sleeve 49. The cap 53 is formed with a number of longitudinal slots or grooves 55 at the periphery thereof which communicate with the interior of the hollow sleeve 49 and subdivide the combustible fuel mixture to form a plurality of small gas streams. These gas streams are discharged from the distributor cap 53 at 56, as shown in Fig. 2, at which region a plurality of relatively small burner flames are produced and maintained. The burner flames project outwardly from the distributor cap 53 at regions closely adjacent to and overlying the surfaces of the parabolic radiator 48 which is heated to a highly radiant condition.

The distributor cap 53 is provided with a central opening which is in alignment with the opening in the hollow sleeve 49 to provide a passage through which the refractory plunger 47 extends through the roof 27. The upper end of the hollow sleeve 49 is recessed and threaded to receive a gland nut 57 to hold suitable packing material 58 about the refractory plunger 47.

In the channel or forehearth leading from the glass melting tank it is usually the practice to effect such heating of the molten glass that a substantially uniform temperature is produced throughout the entire mass of the flowing glass when successive portions thereof reach the delivery bowl or spout. In the embodiment of the invention just described the desired heating of the molten glass in the channel member 12 is accomplished by the radiators 33 distributed in the roof 27. Each of the radiators 33 serve as an independent source of radiant heat which can be individually regulated by adjustment of the supply of combustible fuel mixture thereto, as explained above.

The relatively small flames are produced and maintained in the cup-shaped radiators 33 at regions closely adjacent to the radiator surfaces, so that substantially complete combustion will be effected in the radiator cavities to promote heating of the radiators to high incandescent temperatures and flame impingement of the molten glass 26 will be avoided. Hence, the radiators 33 constitute heating zones capable of being heated to a highly radiant condition and from which radiant heat is directed downwardly toward the molten glass 26. By individually regulating the supply of combustible fuel mixture to each radiator 33, the desired radiant heating pattern may be produced transversely across the channel member 12 and lengthwise thereof so that all of the molten glass 26 passing into the delivery bowl 14 will be at the same desired high temperature.

It should now be understood that the radiant heat emitted from the radiators 33, together with the convection heating produced by the heated products of combustion formed in the cavities of the radiators, provides an intense heating effect which is readily controlled. The heated products of combustion pass from the forehearth chamber 59 through the inlet 11, and an additional opening or openings (not shown) may be provided in the roof 27 through which the products of combustion may also escape.

When the combustible fuel mixture delivered under pressure to the radiators 33 comprises a mixture of air and ordinary gas, such as city gas, natural gas and the like, for example, the radiators may be readily heated to incandescent temperatures as high as 2800° to 2900° F. The gaseous fuel mixture supplied to the radiators 33 is a completely burnable mixture whereby substantially complete combustion may be accomplished in the cavities of the radiators, as previously explained. By properly proportioning the combustible fuel and combustion supporting gas in the fuel mixture, the gaseous atmosphere in the chamber 59 may be maintained either oxidizing, neutral or reducing, depending upon the character of the gaseous atmosphere desired.

In Fig. 1 it will be seen that the end radiators 33 in the row of radiators extending transversely across the forehearth 10 overlie the top spaced apart edges of the refractory channel member 12. By directly applying radiant heat to the top spaced apart edge of the channel member 12, especially to the portions thereof adjacent to the inner wall surface of the channel member, heating of the glass adjacent to the inner wall surface is promoted. In this way heat is conducted downwardly through the spaced apart sides of the channel member 12 to the bottom thereof to promote uniform heating of the glass 26 passing through the channel or forehearth. Since the supply of the combustible fuel mixture to the radiators 33 overlying the spaced apart top edges of the channel member can be individually adjusted, the magnitude of the radiant heating components directed to these parts can be readily controlled.

While the radiant heating of the glass by the radiators 33 can be controlled nicely so that all of the molten glass passes into the delivery bowl 14 substantially at the same high temperature, it may be desirable in certain instances to employ a single large radiator like the radiator 48 directly over the feed opening 45. The radiant heat emitted from the radiator 48 is concentrated directly upon the molten glass at the region the glass passes through the feed opening 45, thereby permitting close control of the temperature of the glass up to the very moment it is discharged from the delivery bowl 14. Such control is readily effected, of course, by independently regulating the supply of the combustible fuel mixture to the radiator 48 by the manually operable valve 52. The provision of the radiator 48 possesses additional advantages including that of subjecting the peripheral surface of the plunger 47 to radiant heat whereby the latter is always effectively maintained at the same temperature as the molten glass about to pass through the feed opening 45.

Although the intense heat applied to the molten glass 26 includes both radiant and convection components, it should be understood that the heating of the glass is predominantly by the radiant component. During operation, the entire inner surface of the refractory wall section 28 of the roof 27 is heated to a radiant condition. However, the highest temperature radiant heat is emitted from the radiators 33 and radiator 48 which can be precisely controlled to effect the desired heating of the glass. Hence, the molten glass is heated in its path of flow through the channel or forehearth by the heating effects produced within chamber 59 and delivery bowl 14 of which a major portion of the highest temperature radiant heat is projected from the radiators 33 and 48, so that heat is absorbed by the glass during the interval of time in which it passes through the channel and delivery bowl at such a rate and in such a manner that the glass may be heated uniformly or in any other controllable manner to the desired high temperature or temperatures. Hence, the viscosity of the molten glass can be precisely regulated to control the rate of flow thereof in the channel or forehearth to the delivery bowl 14.

It will now be understood that an improvement has been provided for effectively controlling the temperature of molten glass in channels or forehearths by applying radiant heat to the molten glass through a gaseous medium in a controlled manner from a plurality of heating zones. The heating zones are heated to a highly radiant condition by effecting substantially complete combustion of a gaseous fuel mixture at regions closely adjacent to the heating zones, thereby permitting the heat zones to be disposed closely adjacent to the molten glass and at the same time avoid flame impingement of the glass. Since the supply of gaseous fuel mixture to each heating zone is independently regulable, the precise radiant heating pattern desired may be produced to effect the necessary heating of the glass. Further, radiant heat can be applied directly to the channel member to promote the desired heating of the glass in the channel or forehearth. By providing a radiant heating zone directly over the feed opening in the delivery bowl, precise control of the temperature of the glass may be effected up to the very moment the glass is discharged from the delivery bowl.

While I have shown and described a single embodiment of the invention, it will be apparent to those skilled in the art that various modifications and changes may be made without departing from the spirit and scope of the invention. It is therefore contemplated to cover all modifications and changes which come within the spirit of the invention, as pointed out in the following claims.

What is claimed is:

1. Glass melting apparatus comprising means forming a channel for flow of molten glass and a delivery bowl into which the glass passes from the channel, said bowl having a feed opening, open cup-shaped radiator means within the bowl concentrically located above the feed opening and positioned to project radiant heat downwardly therefrom, means to heat said radiator means to a highly radiant condition, said bowl having a passage extending upwardly therethrough from said radiator means and communicating therewith, and means for controlling the feeding of glass through the opening including a plunger cooperating therewith which extends upwardly through said passage.

2. Glass melting apparatus comprising means forming a channel for flow of molten glass and a delivery bowl into which the glass passes from the channel, said bowl having a feed opening in the bottom thereof and a cup-shaped radiator in the roof thereof concentric with said feed opening, said roof having a passage extending upwardly therethrough from the radiator and communicating therewith, means to supply a gaseous fuel mixture to the radiator, means including a distributor cap associated with the radiator to effect combustion of the fuel mixture at regions closely adjacent to the radiator to heat the latter to a highly radiant condition, said cap having a central aperture, and means for controlling the feeding of glass through the opening including a plunger cooperating therewith and extending through said aperture and the passage in the roof.

FREDERIC O. HESS.

REFERENCES CITED

The following references are of record in the file of this patent:

UNITED STATES PATENTS

| Number | Name | Date |
|---|---|---|
| 1,661,836 | Kutchka | Mar. 6, 1928 |
| 1,790,820 | Kutchka | Feb. 3, 1931 |
| 1,810,736 | Soubier | June 16, 1931 |
| 1,863,156 | Frink | June 14, 1932 |
| 1,953,407 | Honiss | Apr. 3, 1934 |
| 1,973,689 | Geer et al. | Sept. 11, 1934 |
| 1,991,331 | Morton | Feb. 12, 1935 |
| 2,139,770 | Peiler et al. | Dec. 13, 1938 |
| 2,139,911 | Peiler et al. | Dec. 13, 1938 |
| 2,215,079 | Hess | Sept. 17, 1940 |
| 2,282,554 | Barker, Jr. | May 12, 1942 |
| 2,331,946 | Von Pazsiczky et al. | Oct. 19, 1943 |